L. W. WOOD.
RESILIENT TIRE.
APPLICATION FILED SEPT. 24, 1920.

1,405,960.

Patented Feb. 7, 1922.

Inventor
L. W. Wood.
by Orwig & Hague Att'ys

UNITED STATES PATENT OFFICE.

LEANDER W. WOOD, OF FONTANELLE, IOWA.

RESILIENT TIRE.

1,405,960.     Specification of Letters Patent.     Patented Feb. 7, 1922.

Application filed September 24, 1920. Serial No. 412,601.

*To all whom it may concern:*

Be it known that I, LEANDER W. WOOD, a citizen of the United States, and resident of Fontanelle, in the county of Adair and State of Iowa, have invented a certain new and useful Resilient Tire, of which the following is a specification.

The object of my invention is to provide a resilient tire for wheels, of simple, durable and inexpensive construction, so constructed as to provide a large amount of flexibility when in action, and at the same time being rigid enough to carry the load applied to the wheel, and also to prevent a large amount of lateral and torsional movement relative to the wheel.

A further object is to provide, in a resilient tire, means whereby a maximum amount of traction may be obtained at all times even when the tire has become considerably worn, and also to prevent skidding.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figures 3, 4:
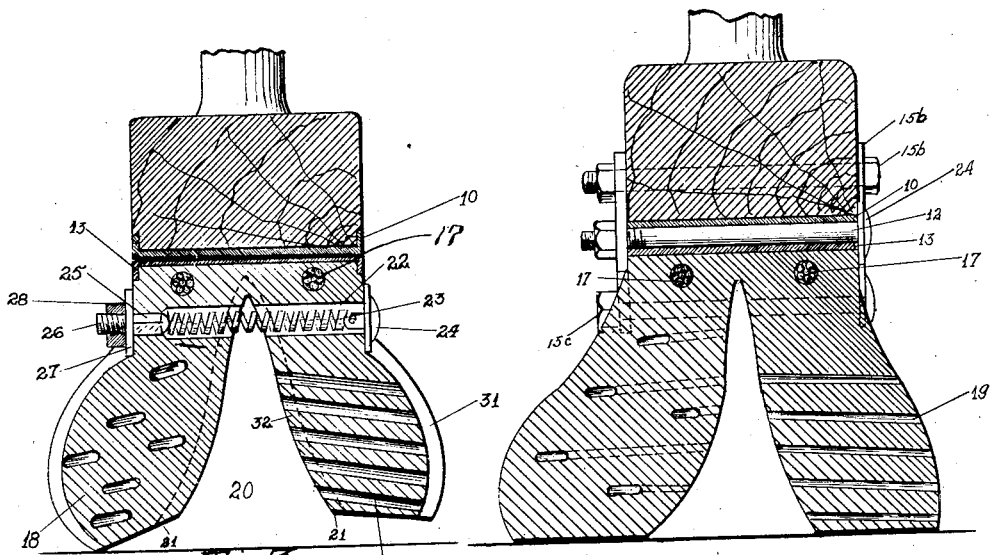
Figure 3 is a transverse sectional view taken on the line 3—3 of Figure 2, showing the relation of the tread members to the ground just as the tire touches it and before the weight or load has been applied.
Figure 4 shows a transverse sectional view taken on the line 4—4 of Figure 2, showing the tire as applied to the ground when the load has been applied.
Figures 1, 2:
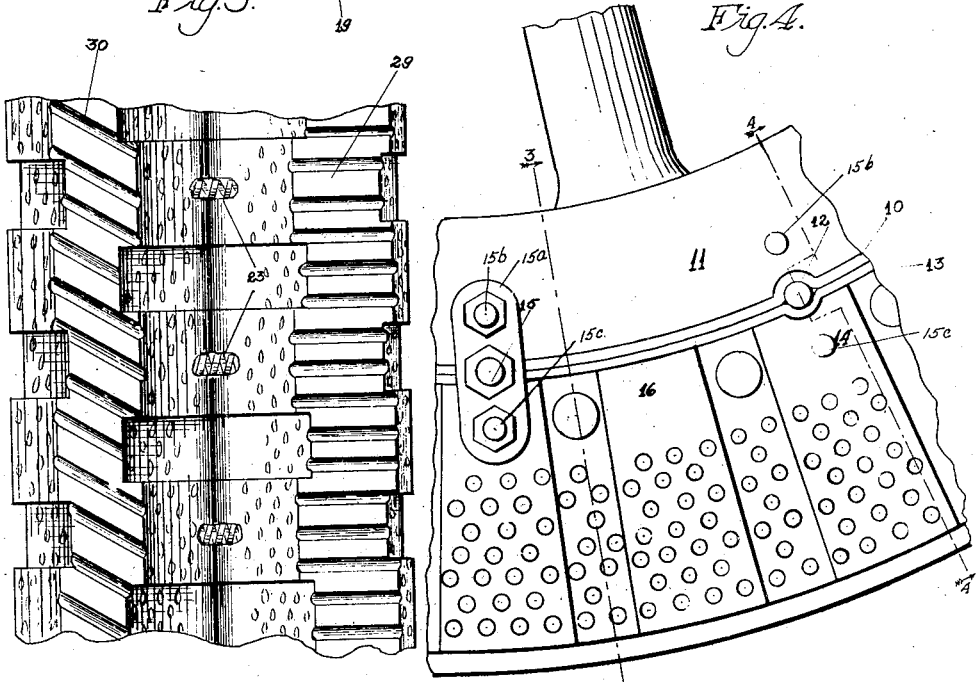
Figure 1 shows an inverted plan view of a portion of the tread of my improved tire.
Figure 2 shows a side elevation of the same as applied to a segment of the wheel.

My improved tire is adapted to be applied to any wheel which requires a resilient tire such as is commonly used on automobiles and trucks.

For applying my improved tire I have preferably provided a rim 10 secured to the felly 11 of the wheel in the usual manner. This rim 10 is provided with a series of transversely arranged corrugated portions 12, designed to fit in suitable grooves in the felly 11. The rim 10 is made somewhat thinner on one side than on the other, so that a tapering periphery is provided. The rim 10 is secured to the wheel in the ordinary way, and is designed to be retained in position at all times.

My improved tire consists of a rim 13 made on a taper, so as to slip over and coact with the rim 10 when in position. The rim 13 is provided with outwardly projecting corrugated portions 14, so spaced as to correspond with the corrugated portions 12 of the rim 10. These corrugated portions form an opening through which bolts 15 may be passed for securing the detachable rim in position on the rim. The tire is formed of what I shall term an annular member 16 having its inner face vulcanized to the rim, and to further aid in securing the tire in position I have provided a series of plates 15$^a$ secured in position by means of bolts 15$^b$ and 15$^c$. Reinforcing rods 17 are provided for preventing the member 16 from stretching when in action.

The member 16 is formed into two diverging annular tread members 18 and 19, with an annular V-shaped groove 20 formed between said members. The member 18 is formed somewhat larger in diameter than the member 19, as clearly shown in Figure 3, and is designed to be placed on the outside when mounted on the wheel. Each of these members 18 and 19 is provided with a beveled face 21.

By this construction it will be seen that when the tire is mounted and the wheel is in action, the member 18 will engage the ground before the member 19, and after the wheel has been advanced slightly the face 21 will engage the ground squarely, as shown in Figure 4, as will also the face 21 of the member 19. By this arrangement the member 18 forms a sort of shock absorber which will give slightly and ease the jolt before the member 19 has reached the ground. The beveled portion 21 also assists, due to the fact that the outer edge of the bevel strikes the ground before the inner edge, making the sharp corner of the member 18 a great deal more resilient than if the entire face of the tread were in engagement with the ground.

It will be seen that as the load is applied on these diverging tread portions, they will have a tendency to spread apart. To assist in holding the tread portions together I have provided a series of openings 22, extending transversely through the inner edge of the member 16 and through the inner edge of the groove 20. Each of these openings is provided with a coil spring 23 having a cap 24 at one end and a squared bolt 25 at the other. The bolt 25 is provided with a screw-threaded portion 26, which is designed to receive a washer 27 and a nut 28. The squared portion 25 is designed to fit a square hole at the end of the opening 22, to prevent the said member from being rotated as the nut 28 is tightened. The spring 23 is of such a length that when in position it will exert a considerable inward pressure to the members 18 and 19, thereby helping to hold them against spreading.

If a heavy shock is applied to the tread members 18 and 19, the spring 23 will yield slightly, thereby causing a cushioning effect under heavy loads without material injury to the material of which the tire is constructed. This material may be any resilient material such as rubber.

To provide a means for increasing the traction of the tire on the ground, I have provided a series of transverse openings 29 in the member 19, and a series of diagonal, transverse openings 30 in the member 18. These openings are arranged in staggered relation to each other, and in such a manner that part of the openings are always at the face 21, so that a series of grooves is formed therein. It will be seen that as the face 21 of the tire is worn down, on account of the staggered relation of the openings 29 and 30 new openings will come to the surface, forming a new set of grooves.

By this arrangement a series of grooves is always provided in the face 21, regardless of how much the tire may be worn. These openings also assist in making the members 18 and 19 more resilient.

In order to provide against the member 18 wearing faster than the member 29, so that the said members may become the same length, I have provided a greater number of openings 29 in the member 19, so that the said member will wear a little faster than the member 18, due to the fact that the area of the face 21 will thereby be made somewhat smaller than the area of the face 21 of the member 18. To further assist in providing traction for the tread members 18 and 19, I have provided a series of substantially radial grooves 31 and 32, the grooves 31 being applied to the outer faces of the members 18 and 19, while the grooves 32 are applied to the inner faces in staggered relation to the grooves 31.

It will thus be seen that I have provided a tire of simple, durable and inexpensive construction, which is very resilient when subjected to shocks, and which is provided with a large amount of grooved surface to engage the ground to prevent slipping.

It will also be seen that due to the fact that the member 18 is longer than the member 19 and placed on the outer side of the wheel, the outer edge of the face 21 will engage the ground in such a manner as to assist in preventing the tire from skidding sidewise or toward the left, as illustrated in Figure 3. When the side action is applied to the said member, the member will have a tendency to dig into the ground.

The groove 20 will also assist in preventing skidding when in soft earth, as the soft earth will be slightly crowded up between the members 18 and 19, due to the weight applied to the wheel.

It will also be seen that the tire may be easily and quickly removed from the wheel by removing the nuts from the bolts 15 and then sliding the rim 13 laterally relative to the rim 10. The bolts 15 also serve to prevent the tire from twisting on the rim.

I claim as my invention:

1. A wheel tire comprising an annular member formed of a resilient material and having two annular diverging treads, one of the treads of said member being slightly greater in diameter than the other, for the purposes stated.

2. A wheel tire comprising an annular member formed of a resilient material and having two annular, diverging, perforated treads, one of the treads of said member being slightly greater in diameter than the other.

3. A wheel tire comprising an annular member formed of a resilient material and having two annular diverging treads, one of the treads of said member being slightly greater in diameter than the other, each of said treads being formed with a series of substantially transverse perforations or openings to form gripping grooves as the tread is worn off.

4. A wheel tire comprising an annular member formed of a resilient material and having two annular diverging treads, one of the treads of said member being slightly greater in diameter than the other, one of the treads being formed with a series of diagonal perforations, and the other with a series of transverse perforations, the said perforations being arranged in staggered relation with each other, substantially as described and for the purposes stated.

5. A wheel tire comprising an annular member formed of a resilient material and having two annular diverging treads, each of said treads being formed with a series of substantially transverse perforations or openings to form gripping grooves for said treads as the tread members are worn off.

6. A wheel tire comprising an annular member formed of a resilient material and having two annular diverging treads, one of the treads being formed with a series of diagonal perforations, and the other with a transverse series of perforations, the said perforations being arranged in staggered relation with each other.

7. A wheel tire comprising an annular member formed of a resilient material and having two annular diverging treads, each of said treads being formed with a series of substantially transverse perforations or openings to form gripping grooves for said treads as the tread members are worn off, and each of said treads being provided with substantially radial inner and outer grooves.

8. A wheel tire comprising an annular member formed of a resilient material and having two annular diverging treads, one of the treads of said member being slightly greater in diameter than the other, and yielding means to resiliently oppose separation of said treads.

9. A wheel tire comprising an annular member formed of resilient material having two annular and separable and diverging treads, yielding means arranged transversely in said treads to resiliently oppose separation of said treads.

10. A wheel tire comprising an annular member formed of resilient material and having annular diverging treads, yielding means to resiliently oppose separation of said treads, each of which comprises a spring, a head member mounted on one end of said spring designed to rest against the outer face of one of the tread members, a screw threaded member attached to the other end of said spring, a washer on said screw threaded member designed to engage the outer surface of the opposite tread member, and a nut on said screw threaded member to engage said washer.

Des Moines, Iowa, August 25, 1920.

LEANDER W. WOOD.